W. Van Gaasbeek,

Sash Fastener.

No. 2,201. Reissued Mar. 13, 1866.

Witnesses:
J. H. Coombs.
G. W. Reed

Inventor:
W. Van Gaasbeek

AM. PHOTO-LITHO. CO. N.Y. (OSBORNE'S PROCESS.)

UNITED STATES PATENT OFFICE.

WASHINGTON VAN GAASBEEK, OF MOUNT VERNON, NEW YORK.

IMPROVED SASH STOPPER AND LOCK.

Specification forming part of Letters Patent No. 44,565, dated October 4, 1864; Reissue No. 2,201, dated March 13, 1866.

*To all whom it may concern:*

Be it known that we, WASHINGTON VAN GAASBEEK and BEEKMAN VAN GAASBEEK, of Mount Vernon, in the county of Westchester and State of New York, are the assignees of Letters Patent dated October 4, 1864, granted to WASHINGTON VAN GAASBEEK for an Improved Sash Stopper and Lock; and we do hereby declare that the following is a full, clear, and exact description of the same, reference being had to the annexed drawings, making a part of this specification, in which—

Figure 1:
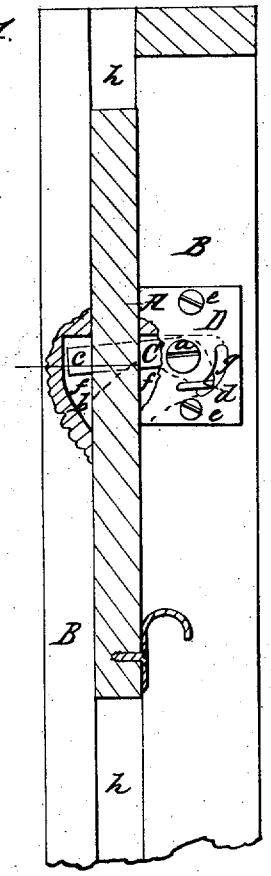
Figure 2:
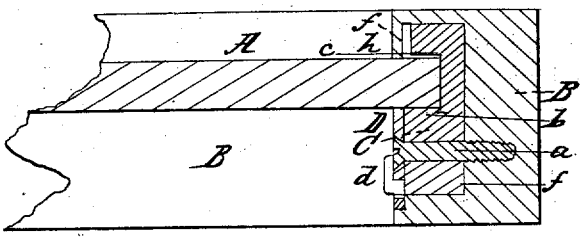
Figure 3:
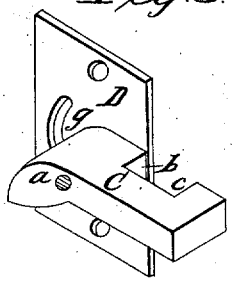

Figure 1 is a vertical section of a sash and its frame, showing the application of my invention. Fig. 2 is a horizontal section of the same, taken right through the stopper. Fig. 3 is a perspective view of the invention.

Similar letters of reference indicate corresponding parts in the several figures.

This sash stopper consists of a small retaining-lever so constructed with a laterally-projecting spur at one end and a thumb-piece at the other that when arranged to work in planes at right angles to the plane of the sash, in a suitable recess in the window frame or casing, it will by its own weight, aided by that of the sash, and without the use of a spring, cause the sash to be held in any position, open or closed, by the biting or clamping of the aforesaid spur against or into the surface of the sash, but that the sash may be relieved instantly by depressing the thumb-piece.

To enable others skilled in the art to make and apply the invention, we will proceed to describe its construction and operation.

A is the sash, and B is the frame in which it works, a groove, *h*, being provided in each side of the said frame for the reception of the sash.

C is the supporting-lever, which also serves as a lock, and may be formed of brass, malleable iron, or any material of sufficient strength. It has one arm much heavier than the other, and is attached by its fulcrum-pin *a* passing through a plate, D, to the frame B, on the inner side of the sash. A recess, *f*, is cut in the frame for the reception of the said lever, and this recess is covered by the plate D, which is secured by screws *e e*. The longer and heavier arm of the lever extends beyond the outer face of the sash, and the said arm has in the side next the sash a recess, *b c*, wide enough for the edge of the sash to pass easily through it, and so arranged that the sash does pass through it. The side *c* of the recess *b c* forms a spur or biting-edge to act against the outer face of the sash, and the side *b* of the recess forms a spur to act against the inner face of the sash. The inner and lighter arm of the lever is made with a knob or projection, *d*, by which to raise the lever C to a horizontal position, so as to liberate the sash. The greater weight of the outer arm of the lever as compared with that of the inner one causes the said arm to drop in such a manner that the spur *c* and the spur *b* thereof will hug the sash, the one hugging against the outer and the other against the inner side of the sash, and when the sash is in an elevated position the weight of the sash tending to depress the lever causes the said spurs to hug it still closer and bite upon it, thereby preventing its descent. The lever, however, is free to be lifted by the friction of the sash, and is thereby freed from the sash when the latter is raised.

To permit the sash to be let down, the knob or projection *d* on the inner end of the lever requires to be pressed down by the thumb or finger, which operation frees the sash from the biting action of the spurs *b c* and allows it to slide freely in the frame. It will be noticed that the most important part of the operation is performed by the outer spur, *c*, which, being farthest from the pivot of the lever, moves a greater distance and takes with a given downward movement of the sash a firmer hold upon the same than the inner spur, *b*, and that, although the two spurs tend to close upon each side of the sash, the spur *b* is only practically effective in assisting the action of the spur *c*, owing to the limited movement of the said spur *b*.

This stopper, it will be understood, operates without the aid of a spring, and is therefore of very simple and cheap construction. To make the stopper act as a lock to lock the lower sash, it must be so arranged that the lever C shall drop the top of or into a recess that may be cut in the sash for its reception in such a manner that the spur *c* shall resist any upward pressure applied to the sash.

What we claim as the invention of WASHINGTON VAS GAASBEEK is—

1. The retaining-lever C, reaching beyond the sash, provided at its outer end with a spur, *c*, arranged to bite upon the outer face of the sash in the manner substantially as set forth, for the purpose specified.

2. In combination with the above the inner spur or biting-edge, *b*, substantially as set forth, for the purpose specified.

W. VAN GAASBEEK.
B. VAN GAASBEEK.

Witnesses:
J. W. COOMBS,
A. LE CLERC.